(12) United States Patent
Doddaiah

(10) Patent No.: US 11,144,349 B2
(45) Date of Patent: Oct. 12, 2021

(54) WEIGHTED RESOURCE COST MATRIX SCHEDULER

(71) Applicant: EMC IP HOLDING COMPANY LLC, Hopkinton, MA (US)

(72) Inventor: Ramesh Doddaiah, Westborough, MA (US)

(73) Assignee: Dell Products L.P., Hopkinton, MA (US)

( * ) Notice: Subject to any disclaimer, the term of this patent is extended or adjusted under 35 U.S.C. 154(b) by 112 days.

(21) Appl. No.: 16/687,730

(22) Filed: Nov. 19, 2019

(65) Prior Publication Data
US 2021/0149718 A1     May 20, 2021

(51) Int. Cl.
*G06F 9/46* (2006.01)
*G06F 9/48* (2006.01)
*G06F 9/50* (2006.01)
*G06F 13/10* (2006.01)

(52) U.S. Cl.
CPC .......... *G06F 9/4881* (2013.01); *G06F 9/5016* (2013.01); *G06F 9/5022* (2013.01); *G06F 9/5044* (2013.01); *G06F 13/105* (2013.01)

(58) Field of Classification Search
CPC .... G06F 9/4881; G06F 9/5016; G06F 9/5022; G06F 9/5044; G06F 13/105
See application file for complete search history.

*Primary Examiner* — Gregory A Kessler
(74) *Attorney, Agent, or Firm* — Anderson Gorecki LLP

(57) ABSTRACT

A scheduler for a storage node uses multi-dimensional weighted resource cost matrices to schedule processing of IOs. A separate matrix is created for each computing node of the storage node via machine learning or regression analysis. Each matrix includes distinct dimensions for each emulation of the computing node for which the matrix is created. Each dimension includes modeled costs in terms of amounts of resources of various types required to process an IO of various IO types. An IO received from a host by a computing node is not scheduled for processing by that computing node unless enough resources are available at each emulation of that computing node. If enough resources are unavailable at an emulation, then the IO is forwarded to a different computing node that has enough resources at each of its emulations. A weighted resource cost for processing the IO is calculated and used to determine scheduling priority. The weights or regression coefficients from the model may be used to calculate weighted resource cost.

18 Claims, 7 Drawing Sheets

Computing Node Multi-Dimensional Weighted Resource Cost Matrix 400

Existing Resource Matrix 500

| Command Type | Atomic Instructions Via InfiniBand Hardware | Block count or Bandwidth Resource | Local buffer Resource | Fibre channel exchange Resource | Direct Memory Access (DMA) | Scatter and Gather List Resource | Shared and Global Write space or buffers | Message bus resources | Compression and Deduplication etc Bandwidth | Small scratch buffer | CPU |
|---|---|---|---|---|---|---|---|---|---|---|---|
| Regression coefficients or weights | 9 | 7 | 2 | 4 | 8 | 3 | 10 | 8 | 6 | 3 | 10 |
| Total Available resources | 10,000 | 16 GBPs (or 33 Million blocks) | 50,000 | 20,000 | 14GBPS or (29 Million blocks) | 20,000 | 70,000 cache slots | 2000 local and 4000 fabric msgs | 8GB or 16Million blocks | 100 | 20 CPU's |

Figure 5

Current Workload Matrix 600

| Command Type | Atomic instructions(DSA) via infiniBand Hardware | Block count or Bandwidth Resource | Local buffer Resource | Fibre channel exchange (FCP) Resource | Direct Memory Access (DMA) | Scatter and Gather List Resource | Shared and Global Write (GM) space buffers | Message bus resources | Compression and Deduplication sit Bandwidth | Small scratch buffer | CPU |
|---|---|---|---|---|---|---|---|---|---|---|---|
| Regression coefficients or weights | 9 | 7 | 2 | 4 | 8 | 3 | 10 | 8 | 6 | 3 | 10 |
| Outstanding resources | 6000 | 12GBPs | 40,000 | 15000 | 12GBPs | 15000 | 55000 | 3000 Fabric | 7GBPs | 75 | 30% busy |
| ... | | | | | | | | | | | |
| READ | 1 DSA | 16 blocks | Local buffer | 1 FCP exchange | 1 GM READ | 17 SGLs | None | 1 Read Prefetch hit | 32 blocks | None | 1 cpu for max 1ms |
| WRITE | 2 DSA | 16 blocks | None | 1 FCP exchange | None | 17 SGLs | 8K buffer | 1 Fabric or 1 local msg | 32 blocks | None | 1 cpu for max 2ms |
| WRITE SAME | N number of DSA based on block count | 384000 | none | 1 FCP exchange | X GM READS | None | 1 GM slot | N number of messages if remote copy | None | 1 | 1 cpu for max 25 seconds |
| UNMAP | N number of DSA based on block count | 384000 | none | 1 FCP exchange | X GM READS | None | 1 GM slot | N number of messages if remote copy | None | 1 | 1 cpu for max 25 seconds |
| Inquiry | 0 | Max 512 | 1 | 1 | 0 | 1 | 0 | 0 | 0 | 0 | 1 cpu for 1 ms |
| Vendor Unique commands | 1 | 256 blocks | none | 1 | 1 | 1 | 1 | 1 | 0 | 1 | 1 cpu for 10ms |
| ... | | | | | | | | | | | |

Figure 6

WEIGHTED RESOURCE COST MATRIX SCHEDULER

TECHNICAL FIELD

The subject matter of this disclosure is generally related to data storage systems, and more particularly to scheduling the processing of IOs (Input-Output operations) in a data storage system.

BACKGROUND

SANs (Storage Area Networks) are key building blocks of a data center. SANs provide servers known as "hosts" with block-level access to data that is used by applications that run on the hosts. One type of SAN is a storage array that includes interconnected computing nodes that manage access to arrays of SSDs (solid-state drives) and HDDs (hard disk drives). A single storage array may support multiple clusters of hosts, each of which may support multiple instances of an application.

IOs (input-output commands) received by the computing nodes of a SAN are buffered and queued for processing by a scheduler. A typical scheduler functions based on queue depth. For example, a computing node with a greater number of queued IOs may be given preference over another computing node with a lesser number of queued IOs.

SUMMARY

All examples, aspects and features mentioned in this document can be combined in any technically possible way.

In accordance with some implementations a method comprises: in a data storage system comprising a plurality of computing nodes that receive IO (Input-Output operation) commands from a plurality of hosts, each computing node comprising a plurality of different emulations, scheduling an IO received by a first computing node by: identifying a resource cost to process the received IO for each emulation of the first computing node; calculating free resources available at each emulation of the first computing node; and scheduling processing of the received IO responsive to determining that the available free resources at each emulation of the first computing node exceed the identified resource cost for each corresponding emulation of the first computing node. In some implementations identifying the resource cost to process the received IO for each emulation of the first computing node comprises identifying one or more of queue depth, processor utilization, local memory utilization, shared memory utilization, bandwidth utilization of Fibre Channel hardware, iscsi hardware, nvme hardware, bandwidth utilization of internal InfiniBand hardware across different boards, compression IOs queue depth and compression hardware bandwidth, deduplication IOs queue depth and deduplication hardware bandwidth, encryption hardware bandwidth and queue depth, and memory bus bandwidth. In some implementations identifying the resource cost to process the received IO for each emulation of the first computing node comprises identifying the resource cost for each of a host adapter, a drive adapter, a remote replication adapter, a local replication and data services adapter, and an operating system. Some implementations comprise calculating a weighted resource cost for processing the received IO. Some implementations comprise determining an order in which the received IO will be processed by the first computing node relative to other scheduled IOs based on the weighted resource cost. Some implementations comprise determining that available free resources at each emulation of a second computing node exceed the identified resource cost for each corresponding emulation of the second computing node responsive to determining that at least one of the available free resources at one or more emulation of the first computing node does not exceed the identified resource cost for each corresponding emulation of the first computing node. Some implementations comprise determining that available free resources at each emulation of a third computing node exceed the identified resource cost for each corresponding emulation of the third computing node responsive to determining that at least one of the available free resources at one or more emulation of the first computing node does not exceed the identified resource cost for each corresponding emulation of the first computing node, and further comprising selecting the second computing node responsive to the second computing node having greater available free resources than the third computing node. Some implementations comprise calculating a weighted resource cost for processing the received IO. Some implementations comprise determining an order in which the received IO will be processed by the second computing node relative to other scheduled IOs based on the weighted resource cost. Some implementations comprise adjusting resource allocation for an emulation of the first computing node based on recency, frequency, and response time of the IO.

In accordance with some implementations an apparatus comprises: a plurality of fabric-interconnected computing nodes that receive IO (Input-Output operation) commands from a plurality of hosts, each computing node comprising a plurality of different emulations; a plurality of managed storage drives; and a scheduler that identifies, for each emulation of a first computing node of the plurality of fabric-interconnected computing nodes, a resource cost to process a first IO received by the first computing node from one of the hosts, the scheduler using matrices to calculate free resources available at each emulation of the first computing node and scheduling processing of the first IO responsive to determining that the available free resources at each emulation of the first computing node exceed the identified resource cost for each corresponding emulation of the first computing node. In some implementations the matrices comprise one or more resource types selected from the group consisting of: queue depth, processor utilization, local memory utilization, shared memory utilization, bandwidth utilization of Fibre Channel hardware, iscsi hardware, nvme hardware, bandwidth utilization of internal InfiniBand hardware across different boards, compression IOs queue depth and compression hardware bandwidth, deduplication IOs queue depth and deduplication hardware bandwidth, encryption hardware bandwidth and queue depth, and memory bus bandwidth. In some implementations the emulations of the first computing node comprise a host adapter, a drive adapter, a remote replication adapter, a local replication and data services adapter, and an operating system. In some implementations the scheduler calculates a weighted resource cost for processing the first IO. In some implementations the scheduler determines an order in which the first IO will be processed by the first computing node relative to other scheduled IOs based on the weighted resource cost. In some implementations the scheduler determines whether other computing nodes have enough available free resources at each emulation to process the first IO in response to determining that at least one emulation of the first computing node lacks enough available resources to process the first IO. In some implementations the scheduler selects one of the other computing nodes having enough available free resources at each emulation to process the first IO based on a comparison of amounts of available free resources. In some implementations the scheduler adjusts resource allocation for an emulation of the first computing node based on recency, frequency, and response time of the IO.

In accordance with some implementations an apparatus comprises: a plurality of fabric-interconnected computing nodes that receive IO (Input-Output operation) commands from a plurality of hosts, each computing node comprising a host adapter, a drive adapter, a remote adapter, and an operating system; a plurality of managed storage drives; and a scheduler that: creates a multi-dimensional weighted resource cost matrix for each of the computing nodes, each of the cost matrices comprising a host adapter dimension, a drive adapter dimension, a local replication and data services adapter dimension, a remote replication adapter dimension, and an operating system dimension, each dimension comprising an indication of numbers of resources for each of a plurality of resource types required for each of a plurality of IO types; and identifies, for each emulation of a first computing node of the plurality of fabric-interconnected computing nodes, a resource cost to process a first IO received by the first computing node from one of the hosts, the scheduler using the multi-dimensional weighted resource cost matrices to calculate free resources available at each emulation of the first computing node and scheduling processing of the first IO responsive to determining that the available free resources at each emulation of the first computing node exceed the identified resource cost for each corresponding emulation of the first computing node. In some implementations the multi-dimensional weighted resource cost matrices comprise resource type weighting coefficients, and wherein the scheduler calculates a weighted resource cost for processing the first IO and determines an order in which the first IO will be processed by the first computing node relative to other scheduled IOs based on the weighted resource cost.

Although no advantages are necessarily associated with any implementations of the invention, some implementations may advantageously avoid scheduling IOs for processing by a computing node that lacks enough resources at one or more emulations to process the IOs. Previous systems, such as schedulers based solely on queue depth, typically consider only queue depth at one emulation. As a result, IO threads could be stalled by lack of enough of a single resource type on another emulation. Further, assigning processing priority based on weighted resource cost may inhibit highly weighted-costly IOs from stalling less weighted-costly IOs.

Other aspects, features, and implementations may become apparent in view of the detailed description and figures.

BRIEF DESCRIPTION OF THE FIGURES

FIG. 5 illustrates an existing resource matrix.

FIG. 6 illustrates a current workload cost matrix.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to one or more of special purpose physical circuit elements, firmware, software, computer instructions that are stored on a non-transitory computer-readable medium and implemented by multi-purpose tangible processors, including any combinations thereof.

Figure 1:
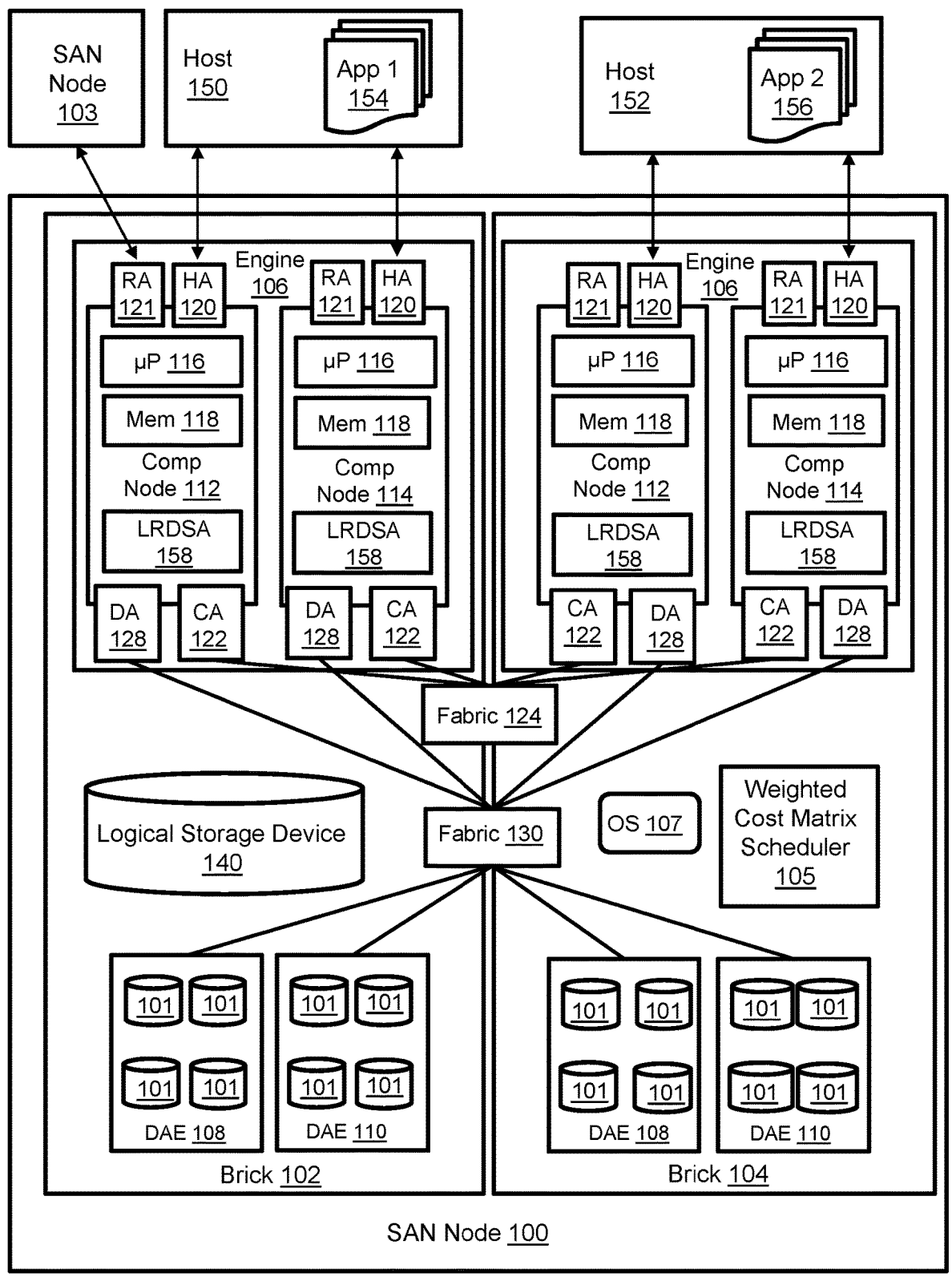
FIG. 1 illustrates a SAN node with a weighted resource cost matrix scheduler.

FIG. 1 illustrates a SAN node 100 with a weighted resource cost matrix scheduler 105. The weighted resource cost matrix scheduler manages how IOs are scheduled for processing by the SAN node. The IOs can include, but are not limited to, READ, WRITE, WRITE SAME, UNMAP, Reservation, Inquiry, and vendor unique commands from a host server 150, 152 and another SAN node 103 (or other type of remote storage system).

The SAN node 100, which may be referred to as a storage array, includes one or more bricks 102, 104. Each brick includes an engine 106 and one or more DAEs (Drive Array Enclosures) 108, 110. Each DAE includes managed drives 101 of one or more technology types. Examples may include, without limitation, SSDs such as flash and HDDs with spinning disk storage media. Each DAE might include 24 or more managed drives but the figure is simplified. Each engine 106 includes a pair of interconnected computing nodes 112, 114, which may be referred to as "storage directors." Each computing node includes resources such as at least one multi-core processor 116 and local memory 118. The processor may include CPUs (Central Processing Units), GPUs (Graphics Processing Units), or both. The local memory 118 may include volatile RAM (Random-Access Memory) of any type, NVM (Non-Volatile Memory) such as SCM (Storage Class Memory), or both. Each computing node includes one or more host adapters 120 for communicating with the hosts 150, 152. Each host adapter has resources for servicing IOs, e.g. processors, volatile memory, and ports via which the hosts may access the SAN node. Each computing node also includes one or more disk adapters) 128 for communicating with the managed drives 101 in the DAEs 108, 110. Each disk adapter has resources for servicing IOs, e.g. processors, volatile memory, and ports via which the computing node may access the DAEs. Each computing node may also include one or more CAs (Channel Adapters) 122 for communicating with other computing nodes via an interconnecting fabric 124. Each computing node may also include one or more local replication and data services adapters (LRDSA) 158, each of which may have resources for servicing IOs. The local data service adapters perform data relocation, data pool management, memory pool management, CPU pool management, and storage tiering management. One or more OSs 107 running on the SAN node has resources for servicing IOs and supports a wide variety of other functions. Each computing node may allocate a portion or partition of its respective local memory 118 to a shared memory that can be accessed by other computing nodes, e.g. via DMA (Direct Memory Access) or RDMA (Remote DMA). The paired computing nodes 112, 114 of each engine 106 provide failover protection and may be directly interconnected by communication links. An interconnecting fabric 130 enables implementation of an N-way active-active backend. A backend connection group includes all DAs that can access the same drive or drives. In some implementations every drive adapter 128 in the storage array can reach every DAE via the fabric 130. Further, in some implementations every drive adapter in the SAN node can access every managed drive 101 in the SAN node. The weighted cost matrix scheduler may include program code stored in the memory 118 of the computing nodes and executed by the processors 116 of the computing nodes.

Data associated with applications 154, 156 running on the hosts 150, 152 is maintained on the managed drives 101. The managed drives 101 are not discoverable by the hosts 150, 152 but the SAN node 100 creates a logical storage device 140 that can be discovered and accessed by the hosts. Without limitation, the logical storage device may be referred to as a production volume, production device, or production LUN, where LUN (Logical Unit Number) is a number used to identify the logical storage volume in accordance with the SCSI (Small Computer System Interface) protocol. The logical storage device 140 is used by the host applications 154, 156 for storage of host application data. From the perspective of the hosts 150, 152 the logical storage device 140 is a single drive having a set of contiguous fixed-size LBAs (logical block addresses) on which data used by instances of the host application resides. However, the host application data is stored at non-contiguous addresses on various managed drives 101.

To service IOs from instances of a host application the SAN node 100 maintains metadata that indicates, among various things, mappings between LBAs of the logical storage device 140 and addresses with which extents of host application data can be accessed from the shared memory and managed drives 101. In response to a data access command from an instance of one of the host applications to read data from the production volume 140 the SAN node uses the metadata to find the requested data in the shared memory or managed drives. When the requested data is already present in memory when the command is received it is considered a "cache hit." When the requested data is not in the shared memory when the command is received it is considered a "cache miss." In the event of a cache miss the accessed data is temporarily copied into the shared memory from the managed drives and used to service the IO, i.e. reply to the host application with the data via one of the computing nodes. In the case of a WRITE to the production volume the SAN node copies the data into the shared memory, marks the corresponding logical storage device location as dirty in the metadata, and creates new metadata that maps the logical storage device address with a location to which the data is eventually written on the managed drives. READ and WRITE "hits" and "misses" occur depending on whether the stale data associated with the IO is present in the shared memory when the IO is received.

SAN node 103 maintains a replica (or snaps or backups or combinations thereof) of the logical storage device 140. Updates to the logical storage device are shared between the SAN nodes. For example, if host 150 sends a WRITE command to SAN node 100 that results in changes to the logical storage device 140 then SAN node 100 communicates the changes to SAN node 103, e.g. with assistance from the OS. Each computing node includes a remote replication adapter 121 for communicating with other storage systems. The remote replication adapter includes resources such as processors, volatile memory, and ports for servicing IOs.

Figure 2:
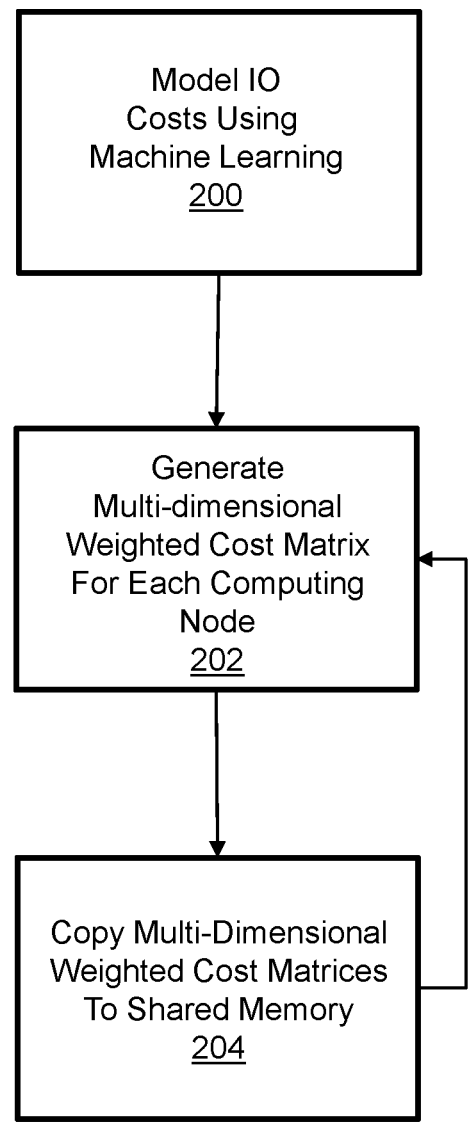
FIG. 2 illustrates generation of multi-dimensional weighted resource cost matrices.

FIG. 2 illustrates a process for generation of multi-dimensional weighted cost matrices. The steps may be implemented in whole or in part by the weighted cost matrix scheduler. Machine learning is used to generate a model of the resource costs and response times and max IOPS for processing different types of IOs as indicated in step 200. Using IOs, resource utilization and IO response time and max IOPs as training data, the machine learning technique models correlations between different IO types, response time, max IOPs and the resources used to service those IO types. The model indicates costs in terms of the numbers of resources of each individual resource type needed to service a single IO of each type. Machine learning results in computation of weights or regression coefficients that indicate strength of correlation between model parameters such as each resource type and response time and maximum IOPs. The weights or regression coefficients are obtained by a decision tree-based ensemble machine learning algorithm that uses an extreme gradient boosting framework to generate non-linear regression models. Each parameter in this model gets its individual weight during training the extreme gradient boosting models. Each weight will not only represent corresponding resource weights but also all non-linear interactions effects between resources within a computing node and all non-linear interaction effects between resources across different computing nodes. These important learned weights are used extensively during distributed load balancing to pre compute the cost of an IO. When hardware or software resources are dynamically increased or decreased then those respective resource types weights are rebuilt using learned models. The model is used to generate cost matrices as described below.

A multi-dimensional cost matrix is generated for each computing node as indicated in step 202. The multi-dimensional cost matrix includes separate matrix dimensions for each resource-owning subsystem (emulation) of the SAN. For example, the host adapters, remote replication adapters, disk adapters, local data services adapters, local replication adapters, and OSs may each be considered emulations. For each dimension the corresponding matrix indicates the modeled resource costs for servicing each type of IO, the weights or regression coefficients for each resource type that were calculated during the model training phase, and the numbers of each resource type that are currently available for use.

The multi-dimensional weighted cost matrices from each of the computing nodes are copied to the shared memory as indicated at step 204. The rate at which the local matrices are copied to shared memory is directly proportional to the current workload on the storage array. Some percentage of hardware resources are reserved exclusively for this distributed scheduling copy operation from local memory to shared memory, so that each adapter in the storage array gets the latest data as soon as possible during peak storage array workload thus helping better scheduling when it is most needed, thereby making the matrices available to the scheduler and all computing nodes. Steps 202 and 204 are iterated over time to update the matrices based on current resource usage, as will be discussed below.

Figure 3:
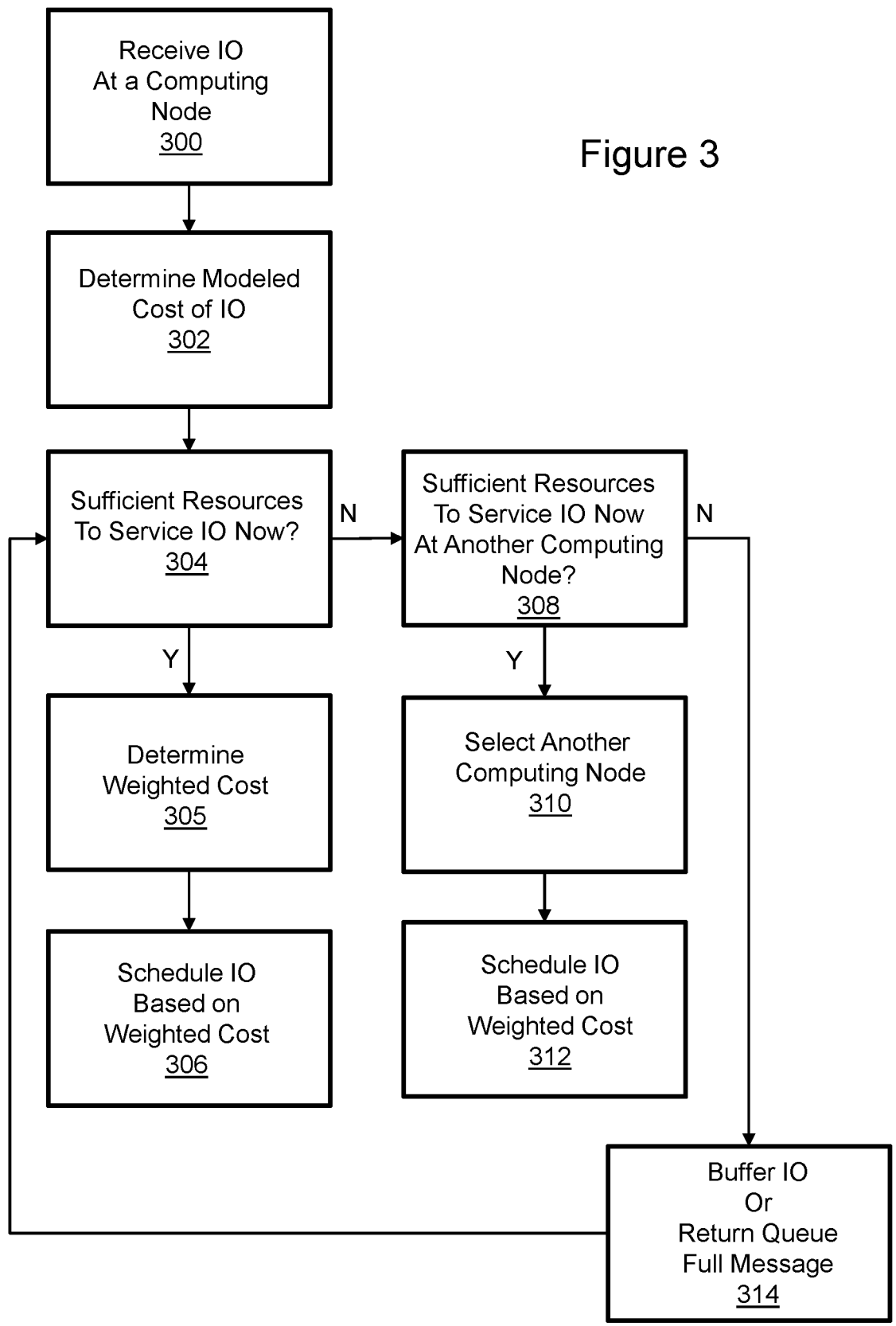
FIG. 3 illustrates operation of the weighted resource cost matrix scheduler.

FIG. 3 illustrates operation of the weighted cost matrix scheduler. After an IO is received at one of the computing nodes as indicated in step 300 the scheduler determines the modeled weighted resource cost of the IO for each resource type for each dimension/emulation of that computing node as indicated at step 302. The modeled weighted resource costs may be determined from the multi-dimensional cost matrix for the computing node that received the IO. The modeled weighted costs are used to determine whether to schedule the IO for processing. Only if there are enough units of every resource type in every dimension of that computing node to process the IO as determined from the cost matrix at step 304 and if the computed cost is less compared to other alternative cost paths will the IO be approved for scheduling. It should be noted that some resource types and some emulations may be uninvolved in processing of some types of IOs.

Having approved the IO for scheduling, a weighted cost is determined for the IO as indicated in step 305. The weights or regression coefficients from the model, which may be indicative of the value of each additional resource of a given type in terms of response time and max IOPs, are used to calculate weighted cost. In some implementations the weighted cost is calculated by multiplying the number of required resources of each resource type by the weight or regression coefficient for that resource type. The weighted costs of all required resource types may be aggregated into a single weighted cost for the IO. The IO is scheduled based on weighted cost as indicated in step 306. More particularly, IOs that are scheduled for processing based on resource costs being satisfiable may be scheduled to be processed in an order based on weighted cost. In some implementations IOs having a lower weighted cost are scheduled ahead of IOs having relatively greater weighted resource cost.

If it is determined at step 304 that there are insufficient resources at any one of the emulations/dimensions for the receiving computing node to process the IO, then the other multi-dimensional cost matrices in the shared memory are examined to determine whether another computing node in the SAN has enough resources to process the IO as indicated at step 308. If at least one other computing node has enough resources at all its emulations/dimensions, then another computing node is selected as indicated in step 310. If multiple computing nodes have enough resources to process the IO, then the computing node having the greatest amount of free resources may be selected. The weighted resource cost is then determined, and the IO is scheduled for processing by the selected computing node as indicated at set 312, including scheduling based on weighted resource cost. If none of the computing nodes has enough resources to process the IO, then the IO may be buffered, or a queue full message may be returned to the host that sent the IO as indicated in step 314. If the IO is buffered then flow returns to step 304, possibly after some time delay.

Figure 4:
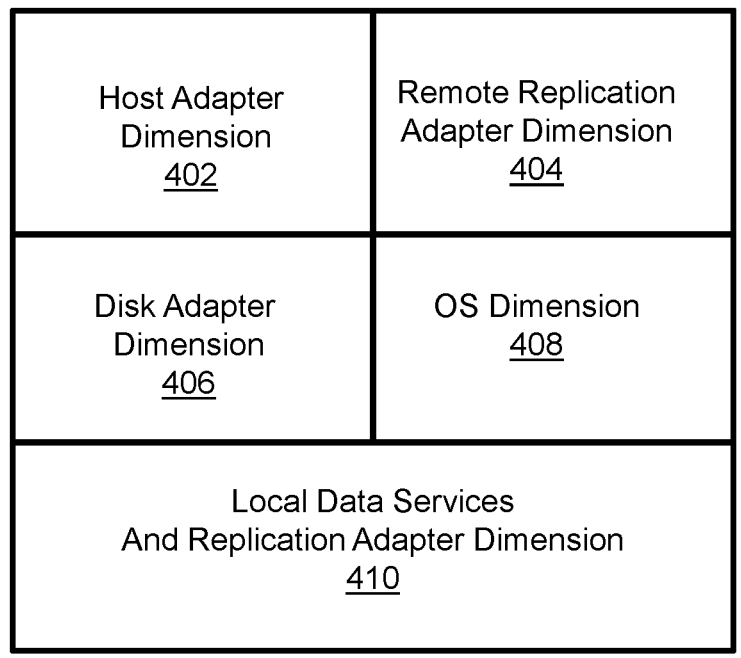
FIG. 4 illustrates a multi-dimensional weighted resource cost matrix for a computing node.

FIG. 4 illustrates a multi-dimensional weighted resource cost matrix 400 for a computing node. The multi-dimensional weighted resource cost matrix 400 include multiple dimensions: a host adapter dimension 402, a remote adapter dimension 404, a disk adapter dimension 406, an OS (operating system) dimension 408, and a local data services and replication adapter dimension 410. The host adapter, remote adapter, disk adapter, local data services and replication adapter, and OS emulations each have resources. For example, both the host adapter and disk adapter have processors and volatile memory. To process an IO such as a read or write it is necessary for all the host adapter, local data service adapter and disk adapter resources to have enough processor and memory resources, otherwise the IO may stall. Consequently, distinct dimensions are created for each resource-owning sub-system. Each emulation for each computing node may independently update its corresponding cost matrix dimension and send the updated dimension to the shared memory. Internal array fabric bandwidth, CPU cycles, message bus, and other SAN resources may be explicitly reserved for scheduler-related traffic.

FIG. 5 illustrates an existing resource matrix 500, which is a component of the multi-dimensional weighted resource cost matrix. An existing resource matrix includes values that represent total numbers of existing resource types in selected units for a single emulation of a single computing node. Weights or regression coefficients are associated with each of those resource types. For example, a computing node or SAN node may have 70,000 slots in the shared memory with a weight of "10" each, and 50,000 local buffers with a weight of "2" each. Thus, the weighted resource cost of one shared memory slot is 10 and the weighted resource cost of one local buffer is 2, these weights are obtained by gradient boosted trees during non-linear modeling. Generally, the existing resource matrix does not change unless resource allocations within the SAN node are readjusted. For example, if the amount of shared memory allocated for data is changed, and thus the number of slots is changed, then the shared memory write space in the existing resource matrix would be updated accordingly.

FIG. 6 illustrates a current workload cost matrix 600, which is a component of the multi-dimensional weighted resource cost matrix. The current workload cost matrix includes values that represent the numbers of the existing resources that are currently being used to process IOs (and any other tasks) for a single emulation of a single computing node. Resource workloads included in the current workload cost matrix and existing resource matrix may include queue depth, current CPU utilization, local memory utilization, shared memory utilization, bandwidth utilization of Fibre channel hardware, iscsi hardware, nvme hardware, bandwidth utilization of internal InfiniBand hardware across different boards, compression IOs queue depth and compression hardware bandwidth, deduplication IOs queue depth and deduplication hardware bandwidth, encryption hardware bandwidth and queue depth and PCI memory bus or system memory bus bandwidth across CPUs. Queue depth is the number of requests vs responses per layer like Fiber Channel, NVME, driver layer, Host Adapter, cache layer, local data service, Disk Adapter, InfiniBand, message bus, compression, deduplication and encryption hardware and software queue depths. Queue depth across read-miss queue, read-miss response queue, write pyramid, Version Write Pending, disk pool management queue, local replication queue, Read Prefetch Q, Asynchronous write placement Q, scrubber, and low priority tasks across all threads may be included, where the low priority tasks include each request and response across InfiniBand threads, local data service threads, local replication threads, storage tier threads, drivers threads for different type of storage hardware like Fibre Channel, NVME, compression, deduplication, software compression, hardware compression, copy and replication threads, TCP/IP, finger print, life signs, configuration threads, operating system threads, cache management threads, message bus threads. Current CPU utilization includes number of CPUs, per core queue depth, latency, and utilization. The parameters may also include message bus queue depth, bandwidth and latency, number of atomic machine compare and swap instructions via InfiniBand hardware latency and queue depths, memory PCI utilization, and queue depth per different type of hardware and CPU cores.

The difference in corresponding numbers of resources between the existing resource matrix and the current workload cost matrix for an emulation is the amount of free resources available from that emulation for an IO being considered for scheduling. Referring to FIGS. 5 and 6, for example, if the IO command type is a READ then the modeled cost is 1 atomic instruction access via InfiniBand hardware, 16 blocks of bandwidth, 1 Direct Memory Access to shared memory etc. The free resources available for that IO are 10,000−6000=4000 atomic instructions access via InfiniBand, 16 GBPs−12 GBPs=4 GBPs blocks of bandwidth, 14 GBPs−12 GBPs=2 GBPs direct memory access to shared memory etc. Because enough of all the resource types required for the READ are available, the READ IO is scheduled. The weighting coefficients are applied to the numbers of resources needed to process the IO, e.g. as multipliers, to calculate the weighted resource cost for processing the IO. For example, the weighted resource cost for using 10 local buffers is the number of local buffers required times the weight for a local buffer, i.e. 10*2=20. The sum of all the weighted resource costs is the (total) weighted cots. The weighted resource cost may then be used to determine the order in which the IO is scheduled for processing relative to other scheduled IOs. For example, IOs having a lower weighted resource cost may be prioritized over IOs having a greater weighted resource cost. Consequently, a small number of weighted-costly IOs are less likely to delay processing of less weighted-costly IOs. This may result in later-scheduled IOs being processed before earlier-scheduled IOs.

Figure 7:
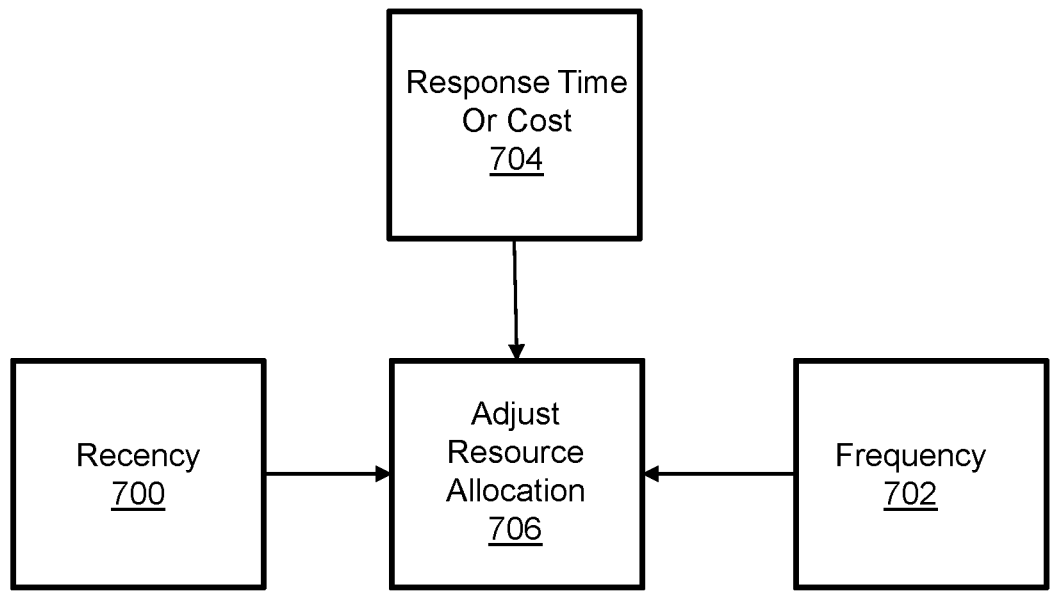
FIG. 7 illustrates adjustment of resource allocation.

FIG. 7 illustrates adjustment of resource allocation. Each emulation may independently adjust resource allocation. Some other resources, e.g. shared memory allocations, are SAN-wide in scope. Recency 700, frequency 702, and response time or cost 704 are used as inputs to determine whether and how to adjust the resource allocations as indicated in step 706. Recency 700 quantifies how recently each resource type was used and average response time for processing IOs during those recent uses. Frequency 702 quantifies how frequently each resource type is used over some selected time period. Cost 704 includes the number of resources of each resource type required to process a type of IO command, like how many scratch buffers are required, how much bandwidth is needed, percentage of CPU cycles or time, etc. If lack of an identified resource type is preventing scheduling or causing response time to fail to meet a host quality of service target for recently received IOs with at least a threshold frequency then more of that resource type may be allocated dynamically, thereby increasing the existing resource. Adjustment of resource allocation may include dynamically increasing and decreasing internal software resources based on recency and frequency to align with incoming IO traffic.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   in a data storage system comprising a plurality of computing nodes that receive IO (Input-Output operation) commands from a plurality of hosts, each computing node comprising a plurality of different emulations, scheduling an IO received by a first computing node by:
   identifying a resource cost to process the received IO for each emulation of the first computing node;
   calculating free resources available at each emulation of the first computing node; and
   scheduling processing of the received IO responsive to determining that the available free resources at each emulation of the first computing node exceed the identified resource cost for each corresponding emulation of the first computing node.

2. The method of claim 1 wherein identifying the resource cost to process the received IO for each emulation of the first computing node comprises identifying one or more of queue depth, processor utilization, local memory utilization, shared memory utilization, bandwidth utilization of Fibre Channel hardware, iscsi hardware, nvme hardware, bandwidth utilization of internal InfiniBand hardware across different boards, compression IOs queue depth and compression hardware bandwidth, deduplication IOs queue depth and deduplication hardware bandwidth, encryption hardware bandwidth and queue depth and memory bus bandwidth.

3. The method of claim 1 wherein identifying the resource cost to process the received IO for each emulation of the first computing node comprises identifying the resource cost for each of a host adapter, a drive adapter, a remote replication adapter, a local replication and data services adapter, and an operating system.

4. The method of claim 1 comprising calculating a weighted resource cost for processing the received IO.

5. The method of claim 4 comprising determining an order in which the received IO will be processed by the first computing node relative to other scheduled IOs based on the weighted resource cost.

6. The method of claim 1 comprising determining that available free resources at each emulation of a second computing node exceed the identified resource cost for each corresponding emulation of the second computing node responsive to determining that at least one of the available free resources at one or more emulation of the first computing node does not exceed the identified resource cost for each corresponding emulation of the first computing node.

7. The method of claim 6 comprising determining that available free resources at each emulation of a third computing node exceed the identified resource cost for each corresponding emulation of the third computing node responsive to determining that at least one of the available free resources at one or more emulation of the first computing node does not exceed the identified resource cost for each corresponding emulation of the first computing node, and further comprising selecting the second computing node responsive to the second computing node having greater available free resources than the third computing node.

8. The method of claim 7 comprising calculating a weighted resource cost for processing the received IO.

9. The method of claim 8 comprising determining an order in which the received IO will be processed by the second computing node relative to other scheduled IOs based on the weighted resource cost.

10. The method of claim 1 comprising adjusting resource allocation for an emulation of the first computing node based on recency, frequency, and response time.

11. An apparatus comprising:
a plurality of fabric-interconnected computing nodes that receive IO (Input-Output operation) commands from a plurality of hosts, each computing node comprising a plurality of different emulations;
a plurality of managed storage drives; and
a scheduler that identifies, for each emulation of a first computing node of the plurality of fabric-interconnected computing nodes, a resource cost to process a first IO received by the first computing node from one of the hosts, the scheduler using matrices to calculate free resources available at each emulation of the first computing node and scheduling processing of the first IO responsive to determining that the available free resources at each emulation of the first computing node exceed the identified resource cost for each corresponding emulation of the first computing node.

12. The apparatus of claim 11 wherein the matrices comprise one or more resource types selected from the group consisting of: IO queue depth, processor utilization, local memory utilization, shared memory utilization, bandwidth utilization of Fibre Channel hardware, iscsi hardware, nvme hardware, bandwidth utilization of internal InfiniBand hardware across different boards, compression IOs queue depth and compression hardware bandwidth, deduplication IOs queue depth and deduplication hardware bandwidth, encryption hardware bandwidth and queue depth and memory bus bandwidth.

13. The apparatus of claim 11 wherein the emulations of the first computing node comprise a host adapter, a drive adapter, a remote replication adapter, a local replication and data service adapter, and an operating system.

14. The apparatus of claim 11 wherein the scheduler calculates a weighted resource cost for processing the first IO.

15. The apparatus of claim 14 wherein the scheduler determines an order in which the first IO will be processed by the first computing node relative to other scheduled IOs based on the weighted resource cost.

16. The apparatus of claim 11 wherein the scheduler determines whether other computing nodes have enough available free resources at each emulation to process the first TO in response to determining that at least one emulation of the first computing node lacks enough available resources to process the first TO.

17. The apparatus of claim 16 wherein the scheduler selects one of the other computing nodes having enough available free resources at each emulation to process the first TO based on a comparison of amounts of available free resources.

18. The apparatus of claim 11 wherein the scheduler adjusts resource allocation for an emulation of the first computing node based on recency, frequency, and response time.

* * * * *